United States Patent [19]

Antlfinger et al.

[11] 4,102,841

[45] Jul. 25, 1978

[54] HEAT SENSITIVE LATICES

[75] Inventors: George John Antlfinger, Avon Lake; Peter Dresel Seletzky, Berea, both of Ohio

[73] Assignee: The B. F. Goodrich Company, Akron, Ohio

[21] Appl. No.: 635,575

[22] Filed: Nov. 28, 1975

[51] Int. Cl.² ............................................. C08L 9/10
[52] U.S. Cl. ...................... 260/29.6 N; 260/29.6 MN; 260/29.6 T; 260/29.7 N
[58] Field of Search .................... 260/29.6 N, 29.7 N, 260/29.6 MN, 29.6 T, 23 EM, 23 AR

[56] References Cited

U.S. PATENT DOCUMENTS

| | | |
|---|---|---|
| 3,294,728 | 12/1966 | Kuhlkamp et al. ......... 260/29.6 MN |
| 3,344,103 | 9/1967 | Eilbeck et al. ................. 260/29.7 T |
| 3,702,315 | 11/1972 | Knechtges et al. ......... 260/29.6 MN |
| 3,878,152 | 4/1975 | Distler et al. ............... 260/29.6 MN |
| 3,989,661 | 11/1976 | Bondy ............................ 260/23 EM |

*Primary Examiner*—M. J. Welsh
*Attorney, Agent, or Firm*—J. Hughes Powell, Jr.

[57] ABSTRACT

Polymeric latices are made more heat sensitive by the presence of an ethoxylated tertiary amine. Improved control and gelled products are obtained when a combination of ethoxylated tertiary amine and a silicone polyether or poly(vinyl methyl ether) agent are added to an anionic latex of a polymer.

7 Claims, No Drawings

HEAT SENSITIVE LATICES

BACKGROUND OF THE INVENTION

Latices containing aqueous dispersions of a variety of polymeric, normally elastomeric, materials can be made heat sensitive by the addition thereto of certain heat sensitizing silicone polyethers. There are disadvantages to the use of these materials because of the cost when large amounts must be used, and ineffectiveness in many cases with a great variety of latices containing different polymers and emulsifier systems. A system is desired that provides more versatility and control of gelation temperature of latices made heat sensitive with silicone polyethers

SUMMARY OF THE INVENTION

An improved system is provided applicable to a great variety of latices of aqueous dispersions of polymeric materials both as to variety of polymer and emulsifying or suspending system in the latex by the addition thereto of certain ethoxylated tertiary amines. Further improvement is obtained when small amounts of silicone polyether or poly-(vinyl methyl ether) sensitizing agents are also used with the ethoxylated tertiary amines. By means of this system, improved control of gelation, temperature and quality of the resulting gel is obtained as compared to systems not containing the ethoxylated tertiary amines.

DETAILED DESCRIPTION

The process of this invention may be applied to a great variety of latices of aqueous dispersions of polymers containing anionic surfactants. It is valuable with latices of elastomeric polymers such as those represented by homo- and copolymers of butadiene, isoprene, the alkyl acrylates, chloroprene, alkylvinyl ethers, methylvinyl ethers and the like. More normally, the polymers of these latices contain a major proportion, that is, more than 50% of one elastomeric contributing monomer exemplified by conjugated dienes having from 4 to 8 carbon atoms, especially butadiene-1,3 and isoprene and/or alkyl acrylates wherein the alkyl group contains 1 to 8 carbon atoms as represented by methyl acrylate, ethyl acrylate, butyl acrylate, 2-ethylhexyl acrylate, and the like. These diene and acrylate copolymers may also contain at least about 1 weight percent, up to about 50 weight percent, of other copolymerizable vinylidene monomeric materials containing at least one $CH_2CH<$ group such as the styrenes, as alpha-methyl styrene and chlorostyrene; the alkyl acrylates and methacrylates of the formula

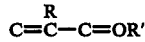

wherein R is hydrogen, methyl or ethyl and R' is an alkyl group containing from 1 to 18 carbon atoms; haloacrylates such as chloroethyl acrylate; alkyl vinyl ethers such as chloroethyl vinyl ether and methyl vinyl ether; alkyl vinyl ketones such as methyl vinyl ketones; nitrile such as acrylonitrile and methacrylonitrile; alpha, beta-unsaturated carboxylic acids such as acrylic acid, methacrylic acid, itaconic acid and the like; vinyl pyridine; vinyl halides as vinyl chloride, vinylidene chloride; acrylamides as methacrylamide and N-methylol acrylamide, flexible copolymers of vinyl chloride, vinyl acetate and vinylidene chloride made flexible either by the incorporation of sufficient plasticizer into the polymer in an aqueous dispersion; or by means of comonomers including the lower alkyl acrylates to provide sufficient flexibility to the vinyl halide polymer. The invention is applicable to anionic latices of polymers having a Tg° of greater than about 100° to about 60° C., preferably about −80° C. to 150° C.

While the improved process of the invention is particularly applicable to latices of flexible polymers, it is also equally applicable in heat gelling hard nonflexible polymers including polymers in latex form, for example, of vinyl chloride, vinyl acetate, methyl methacrylate, styrene and the like. By means of this process, one is able to obtain by the heat sensitization method, gelled, porous structures of polyvinyl chloride, polystyrene and the like, as compared to continuous film obtainable with flexible polymers.

These polymers and others well known in aqueous latex form are described in the literature including, for example, Vinyl and Related Polymers, Schildknecht (Wiley) and Synthetic Rubber, Whitby (Wiley), both of which include well known polymerization processes for preparing such polymer latices. In general, the improved system of this invention can be used with any anionic latex or aqueous dispersion, suspension or emulsion of any polymeric material. Particularly useful are latices of polymers that form continuous film on drying of said suspension, dispersion. Such films are preferably flexible at room temperature and more preferably, may be elongated at room temperature at least 100% of the original length without fracturing, breaking or otherwise destroying the surface of the polymer.

The total solids of the latexes treated as described may be varied quite widely as low as about 15%, but more normally for commercial purposes the latexes will contain greater than about 20 to about 75 weight percent total solids of polymer, and more preferably from about 30 to about 65 weight percent. The pH of the latex has some effect on the temperature of gelation. Generally, gelling occurs at lowest temperatures at lowest pH consistent with a stable latex at room temperature. A pH below 10, and preferably below about 9, is usually maintained.

Anionic surface active agents normally found in polymer latices include a great variety of types including sodium or potassium salts of disproportionated rosin acid soap as sodium dihydroabietate, fatty acid soaps such as sodium stearate and potassium oleate, alkali soaps of naphthenic acid, alkyl sodium sulfosuccinates such as diamyl, dihexyl and dioctyl, sodium alkyl sulfates as sodium lauryl sulfate, sulfated fatty acid amides and esters, sodium sulfates of acid esters as lauric and oleic, sodium salts of sulfonated oils, alkylaryl sulfonates such as sodium alkyl naphthalene sulfonate and sodium alkyl benzene sulfonates, sodium benzyl naphthalene sulfonate, isobutyl naphthalene sodium sulfonate, sodium naphthalene sulfonic acid condensate and the like. The amounts present in the latex are usually greater than about 0.01 weight part per 100 weight parts of latex solids, more usually about 1 to about 10 weight parts.

Other surface active agents may be used, either originally in the polymerization or added, for example, water soluble nonionic surface active agents usually in conjunction with anionic agents. Such materials include, for example, nonylphenoxy poly(ethyleneoxy)ethanol as representative of alkyl aryl polyether nonionic agents. Also included are alkylaryl polyether alcohols, polyoxyethylene sorbitan monolaurate and the like.

The ethoxylated tertiary amines include those having one fatty alkyl group derived from fatty sources having from 12 to 18 carbon atoms and two polyoxyethylene groups attached to the nitrogen and having the formula:

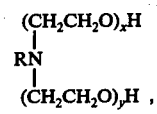 (1)

and which are the reaction products of a N-alkyl amine and ethylene oxide; and derivatives of the polyethoxylated aliphatic amines obtained by the reaction therewith of methyl chloride, which have the formula

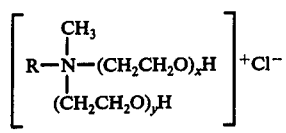 (2)

Closely related materials are reaction products of N-alkyl trimethylene diamines and ethylene oxides having the formula

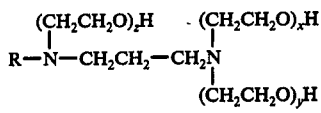 (3)

In all of these R is an alkyl group containing from about 10 to 22 carbon atoms, more preferably 12 to 20 carbon atoms, being derived from, for example, myristic lauric, malmitic, stearic, oleic, abietic, linoleic, linolenic and like fatty acids; and $x$, $y$ and $z$ are greater than 2 and more preferably are from about 5 to 50 moles per mol of fatty amine. Preferably, these materials contain greater than 5, as about 10 to 25 mols of ethylene oxide agents containing as high as about 10 mols of ethylene oxide may be used. The amounts used, based on 100 weight parts of polymer are from about 1 to about 20 weight parts, more preferably about 2 to 10.

The silicone polyethers useful as heat sensitizers in accordance with this invention may be either soluble or insoluble in water, although water-soluble silicone polyethers are more conveniently incorporated into the latex. Silicone polyethers having an inverse water solubility curve wherein the silicone polyether exhibits solubility in water at room temperature (25° C.) and water insolubility at a temperature moderately above room temperature are preferred. Silicone polyethers found to be particularly useful may be described as being a silicone-oxyalkylene block copolymer containing a butoxy-stopped ethylene-propylene glycol polymer attached to silicon atoms of methyl silicone through urethane linkages. A general formula for such silicone polyethers is:

wherein $n$, $a$, $b$ and $c$ integers, as described in U.S. Pat. Nos. 3,483,240 and 3,483,394.

The siloxane-oxyalkylene copolymer has the formula:

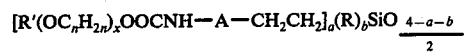

where R is an organic radical attached to silicon through a silicon-carbon linkage, R' is a member selected from the class consisting of lower alkyl radicals, e.g., alkyl radicals containing from 1 to 7 carbon atoms, and aryl radicals; A is a divalent hydrocarbon radical containing no more than about 7 carbon atoms; $a$ has a value of from 0.50 to 1.00, inclusive; $b$ has a value of from 1.12 to 1.90, inclusive; the sum of $a$ plus $b$ is equal to from 2.02 to 2.40, inclusive; $n$ has a value of from 2 to 4, inclusive; and $x$ has a value of at least 5, e.g., from 5 to 100 or more.

One of the preferred types of organohydrogenpolysiloxanes used in preparing the siloxane-oxyalkylene copolymers of the present invention are the triorganosilyl chainstopped copolymers of diorganosiloxane units and organohydrogensiloxane units having the formula:

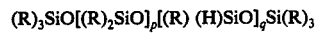

where R is as previously defined, $p$ has an average value of from 0 to 45, inclusive, $q$ has a value at least as great as $p$ and from 3 to 48, inclusive, and the sum of $p$ plus $q$ is equal to from 3 to 48, inclusive, and where the sum of the silicon-bonded R groups plus the silicon-bonded hydrogen is equal to from 2.04 to 2.40 per silicon atom. In the preferred embodiment $p$ is 0 and all of the R groups are methyl.

Although from greater than 0.01 to 5 or more parts by weight of the silicone polyether per 100 parts by weight of latex solids may be used in accordance with this invention, for optimum commercial adaptability from 0.1 to 1.0 part by weight of the silicone polyether per 100 parts by weight of latex solids is preferred. Both the amine derivative and silicon polyether are readily stirred into the latex.

Other useful heat sensitizers include a water soluble linear homopolymer of alkyl vinyl ether, i.e., poly(vinyl methyl ether) and others when the alkyl group contains 1 to 4 carbon atoms being soluble in water and having a K value of about 30 to 50 and a specific viscosity measured on one gram/100 ml benzene of about 0.2 to about 0.7, normally 10 to 25 weight percent water solutions are employed and the amount of poly(methyl vinyl ether) used will be greater than about 0.1 to 10 weight parts per 100 weight parts of latex solid.

It was quite unexpected to find that the ethoxylated tertiary amines alone would contribute the gelling of latices. To demonstrate this, latex No. 8 of the Examples containing a polymer of 94% butadiene, 3% acrylonitrile, 1.2% acrylic acid and 1.8% N-methylol acrylamide, stabilized with 1.8% sodium lauryl sulfate was compounded with 4 weight parts (in a 20% water solution) of an ethoxylated tertiary amine of the formula (1) above containing: (a) 2 mols of ethylene oxide, and (b) 15 mols of ethylene oxide, R in both cases being derived from coco fatty acid, 20% tartaric acid solution was added to control gel formation. In the case of (a), heavy polymer coagulum was observed after the addition of the cationic soap, which is completely unsatisfactory. In the case of (b) no coagulum was obtained after the addition of the agent and a smooth gel was obtained on the addition of 1.4 weight parts of dry tartaric acid in a 20% solution to a final pH of 3.5. Another test was run wherein R was derived from stearic acid and the agent contained 50 mols of ethylene oxide and this also was satisfactorily in that no coagulant was obtained after the addition of the agent and smooth gel was formed on the addition of 0.8 weight part of tartaric acid in a 20% aqueous solution.

Similar tests were run with the ethoxylated tertiary amines of (3) above wherein R was derived from tallow fatty acid. When the agent contained only 3 mols of ethylene oxide, heavy coagulum was obtained on addition of the agent to the latex. With agents containing 10 and 15 mols of ethylene oxide slight coagulum was observed on addition of the agent and gel was obtained when tartaric acid was added. Tests were also run with ethoxylated tertiary amines having formula (2) above using tartaric acid. In these runs heavy coagulum was observed on the addition of the agent where the agent contained only 2 mols of ethylene oxide and R was derived from coco fatty acid or oleic acid and stearic acid. Using other agents and the same fatty acids but containing 15 mols of ethylene oxide, no coagulum was observed on addition of the agent and after adjustment of the pH of the latices to about 4, these three latices gelled at room temperature.

To further demonstrate the improved process of the invention with a great variety of polymers in aqueous dispersion and a variety of anionic emulsifiers, latices of the composition set forth in the data tables that follow were mixed with one part of each of a 10 weight percent solution of the heat sensitizing agent and 4 to 8 weightparts of a 25% solution of a polyethoxylated quaternary ammonia salt wherein the alkyl radical R is derived from coco fatty acid and 15 mols total of ethylene oxide of the formula To test for gel temperature, gel quality, and gel strength, 15 ml of freshly stirred latex compound was placed in a 50 ml test tube. A centigrade thermometer was inserted into the test tube. The thermometer was a mercury thermometer with a scale stirring at $-20°$ C. ranging to $110°$ C. The test tube containing both heat sensitized compound and thermometer was placed into a beaker of boiling water and stirred with the thermometer slowly and continuously. The latex compound preferably gels in the $45°$ C. to $60°$ C. range. The gelled compound is left in the test tube until the temperature inside the latex gel has risen to $10°$ C. above the compound's gelation point. The test tube is removed from the bath and the gelled latex plug into a beaker of water (room temperature or colder). The degree of latex gelation of the polymer compound in the beaker water is observed along with the appearance of water. While water present in the result of at least some uncoagulated latex.

After the plug has been in the water for 10 minutes and has cooled to room temperature, the plug is cut in half. The gel structure is rated according to ratings following. A weak gel is usually very easily pulled apart and grainy inside. "Tough gel" should be reported when the structure is continuous and meaty. In addition, "tough gels" will be very difficult to pull apart or tear.

The term gelation in this test method refers to the compound forming a continuous, tough solid in a specific temperature range. Latexes which only partially gels, leaving some latex particles, in the water phase are said to have produced "white water". Latex compounds that gel in the specified temperature range but upon examination of the gel structure (cut open) are very grainy or sandy inside, can be said to be weak in gel structure. A "good tough gel" has the consistency of well cooked beef steak and the aqueous phase after gelation should not contain latex or "white water".

The results obtained are shown in the data tables I and II.

TABLE I

| Latex No. | 1 | 2 | 3 | 4 | 5 | 6 | 7 | 8 | 9 | 10 | 11 | 12 |
|---|---|---|---|---|---|---|---|---|---|---|---|---|
| Monomers - weight parts | | | | | | | | | | | | |
| Butadiene | 67.0 | 55.0 | 66.0 | 65.0 | | | | | | | 100.0 | |
| Styrene | | | | | | | | | | | | 100.0 |
| Ethylacrylate | | | | | | 100 | | 94.0 | | | | |
| Vinyl chloride | | | | | | | | | 100.0 | 80.0 | | |
| Acrylonitrile | 33.0 | 42.0 | 30.0 | 32.0 | | 10.0 | 11.0 | 3.0 | | | | |
| Methyl acrylate | | | | | | | | | | 20.0 | | |
| Acrylic acid | | | | | | | | 1.2 | | | | |
| Hydroxyethylacrylate | | | | | | 4.0 | 5.0 | | | | | |
| Acrylamide | | | | | | | | | | | | |
| N-methylol acrylamide | | | | 3.0 | | 1.0 | | 1.8 | | | | |
| Butyl acrylate | | | | | | 84.0 | 82.0 | | | | | |
| Methacrylic acid | | 3.0 | 3.0 | | | 1.7 | 2.7 | | | | | |
| Potassium Stearate | 5.0 | | | | | | | | | | | |
| Sodium lauryl sulfate | | 2.7 | | 2.9 | | 2.5 | 2.50 | 1.8 | | | | |
| Na alkylaryl polyether sulfonate | | 2.0 | 1.7 | | | | | | | | | |
| Sodium dodecyl benzene sulfonate | | | 2.7 | 2.6 | | | | | 2.7 | 1.1 | | |
| Potassium oleate | | | | | | | | | | | 4.0 | |
| Lomar PWA[(1)] | | | | | | | | | | | | 1.5 |

[(1)]Ammonium salt of HCHO condensed naphthalene sulfonic acid.

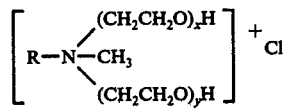

TABLE II

LATEX COMPOUNDS - WEIGHT PARTS (DRY POLYMER)

| Latex No. | Total Solids | | | | | | | | |
|---|---|---|---|---|---|---|---|---|---|
| 1 | 40.1 | 100 | 100 | | | | | | |
| 2 | 44.7 | | | 100 | 100 | | | | |
| 3 | 50.0 | | | | | 100 | 100 | | |
| 4 | 47.2 | | | | | | | 100 | 100 |
| 5 | 50.1 | | | | | | | | |
| 6 | 50.1 | | | | | | | | |
| 7 | 50.1 | | | | | | | | |
| 8 | 52.3 | | | | | | | | |
| 9 | 55.5 | | | | | | | | |
| 10 | 50.9 | | | | | | | | |
| 11 | 46.0 | | | | | | | | |
| 12 | 46.2 | | | | | | | | |
| Si polyether[1] t-amine | 10.0 | 1 | 1 | 1 | 1 | 1 | 1 | 1 | 1 |
| Ethoxylated t-amine[2] | 25.0 | 4 | 8 | 4 | 8 | 4 | 8 | 4 | 8 |
| Compound Properties | | | | | | | | | |
| pH | | 9.3 | 9.2 | 7.4 | 7.2 | 6.8 | 6.6 | 6.0 | 6.0 |
| Gel Temperature—° C. | | 44 | 38 | 48 | 46 | 40 | 40 | 57 | 48 |
| Gel Strength | | 4 | 4 | 4 | 4 | 4 | 4 | 3 | 3 |
| White Water after gelation | | none | none | slight | slight | none | none | none | none |

| Latex No. | Total Solids | | | | | | |
|---|---|---|---|---|---|---|---|
| 1 | 40.1 | | | | | | |
| 2 | 44.7 | | | | | | |
| 3 | 50.0 | | | | | | |
| 4 | 47.2 | | | | | | |
| 5 | 50.1 | 100 | 100 | | | | |
| 6 | 50.1 | | | 100 | 100 | | |
| 7 | 50.1 | | | | | 100 | 100 |
| 8 | 52.3 | | | | | | |
| 9 | 55.5 | | | | | | |
| 10 | 50.9 | | | | | | |
| 11 | 46.0 | | | | | | |
| 12 | 46.2 | | | | | | |
| Si polyether[1] t-amine | 10.0 | 1 | 1 | 1 | 1 | 1 | 1 |
| Ethoxylated t-amine[2] | 25.0 | 4 | 8 | 4 | 8 | 4 | 8 |
| Compound Properties | | | | | | | |
| pH | | 8.5 | 5.3 | 4.5 | 3.7 | 4.7 | 4.5 |
| Gel Temperature° C. | | 39 | 38 | 68 | 50 | 65 | 43 |
| Gel Strength | | 4 | 4 | 3 | 4 | 4 | 6 |
| White Water after gelation | | none | none | none | none | none | none |

| Latex No. | Total Solids | | | | | |
|---|---|---|---|---|---|---|
| 1 | 40.1 | | | | | |
| 2 | 44.7 | | | | | |
| 3 | 50.0 | | | | | |
| 4 | 47.2 | | | | | |
| 5 | 50.1 | | | | | |
| 6 | 50.1 | | | | | |
| 7 | 50.1 | | | | | |
| 8 | 52.3 | 100 | 100 | | | |
| 9 | 55.5 | | | 100 | 100 | |
| 10 | 50.9 | | | | | 100 |
| 11 | 46.0 | | | | | |
| 12 | 46.2 | | | | | |
| Si polyether[1] t-amine | 10.0 | 1 | 1 | 1 | 1 | 1 |
| Ethoxylated t-amine[2] | 25.0 | 4 | 8 | 4 | 8 | 4 |
| Compound Properties | | | | | | |
| pH | | 5.0 | 4.8 | 9.8 | 9.9 | 9.7 |
| Gel Temperature° C. | | 43 | 40 | 75 | 72 | 95 |
| Gel Strength | | 4 | 4 | 3 | 3 | 2 |
| White Water after gelation | | none | none | none | none | none |

| Latex No. | Total Solids | | | |
|---|---|---|---|---|
| 1 | 40.1 | | | |
| 2 | 44.7 | | | |
| 3 | 50.0 | | | |
| 4 | 47.2 | | | |
| 5 | 50.1 | | | |
| 6 | 50.1 | | | |
| 7 | 50.1 | | | |
| 8 | 52.3 | | | |
| 9 | 55.5 | | | |
| 10 | 50.9 | | | |
| 11 | 46.0 | 100 | 100 | |
| 12 | 46.2 | | | 100 |
| Si polyether[1] t-amine | 10.0 | 1 | 1 | 1 |
| Ethoxylated t-amine[2] | 25.0 | 4 | 8 | 8 |
| Compound Properties | | | | |

TABLE II-continued

| | LATEX COMPOUNDS - WEIGHT PARTS (DRY POLYMER) | | |
|---|---|---|---|
| pH | 4.2 | 5.0 | 8.5 |
| Gel Temperature—° C. | 33 | 40 | 51 |
| Gel Strength | 4 | 4 | 3 |
| White Water after gelation | none | none | none |

Gel Strength Ratings - Tough=6, Medium Tough=5, Medium=4, Weak=3, Weak and Crumbly=2, No Gel=0
[1][CH$_3$SiO$_3$] [(CH$_3$)$_2$SiO]$_{20}$ ((CH$_3$)$_2$Si—CH$_2$—O—[C$_2$H$_4$O]$_{4.3}$[C$_3$H$_6$O]$_3$C$_4$H$_9$)$_3$ (2) 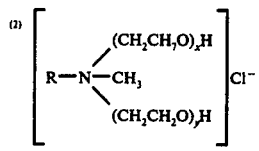

where R is derived from coco fatty acid and $x + y = 15$ moles

An advantage of this system of the combined use of the silicone polyether heat sensitizing agent and ethoxylated tertiary amine agent is that most cationic surface active agents coagulate the polymer before one obtains gelling. Further, there are many systems where the silicone polyether alone does not cause heat sensitization of the treated latex such as latices containing sodium lauryl sulfate or the degree of heat sensitization is not satisfactory. However, this combination is effective in such systems including, for example, sodium lauryl sulfate stabilized latices. Further, better control of gelation temperature and type of gel are obtained when the novel combination of silicone polyether and ethoxylated tertiary amine is used than is obtainable with either one alone.

We claim:

1. A heat sensitive polymeric synthetic anionic latex consisting essentially of polymerized vinylidene monomers having at least one terminal CH$_2$C< group, said polymers having a Tg° of about −80° C. to 150° C. containing a heat sensitizing amount of an ethoxylated amine selected from the group consisting of compounds having the formula

and

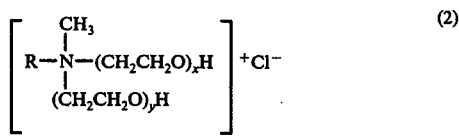

wherein R is an alkyl group containing 10 to 22 carbon atoms and the total of $x$ and $y$ is greater than 5 to about 50 and a heat sensitizing amount of a silicone polyether of the formula

wherein $n$, $a$, $b$ and $c$ are integers.

2. A latex of claim 1 wherein the film-forming polymer contains more than 50 weight percent of butadiene-1,3 or an alkyl acrylate containing 1 to 8 carbon atoms and up to about 50 weight percent of at least one other copolymerizable monomeric vinylidene monomer containing at least one CH$_2$C< group.

3. A latex of claim 2 wheren the solicone polyether has the formula

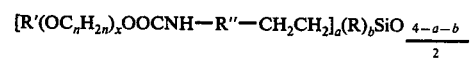

wherein R is an organic radical attached to silicon through a silicon-carbon linkage, R' is a member selected from the class consisting of lower alkyl radicals containing from one to seven carbon atoms, and aryl radicals; R" is a divalent hydrocarbon radical containing no more than about seven carbon atoms; $a$ has a value of from 0.50 to 1.00, inclusive; $b$ has a value of from 1.12 to 1.90, inclusive; the sum of $a$ plus $b$ is equal to from 2.02 to 2.40, inclusive; $n$ has a value of from 2 to 4, inclusive; and $x$ has a value of at least 5 to 100.

4. A latex of claim 3 wherein the anionic surface active agent is an alkali metal alkyl sulfate or alkyl aryl sulfonate present in amounts from about 0.1 to about 10 weight parts; the ethoxylated amine contains greater than 10 to about 30 mols of ethylene oxide present in amount from about 1 to 10 weight parts per 100 weight parts of polymer in said latex and about 0.1 to 5 weight parts of said silicone polyether per 100 weight parts of polymer in said latex.

5. A latex of claim 4 wherein said polymer is a polymer containing more than 50 weight percent of butadiene1,3 to about 0.1 to 5 weight parts of acrylic acid and 0.1 to 5 weight parts N-methylol acrylamide and in said ethoxylated amine R is selected from the group of alkyl radicals containing from 12 to 20 carbon atoms containing about 10 to 25 mols of ethylene oxide.

6. A latex of claim 4 wherein the polymer contains more than 50 weight percent of an alkyl acrylate wherein the alkyl group contains 1 to 4 carbon atoms, and about 0.1 to 5 weight parts of acrylic acid and about 0.1 to 5 weight parts of N-methylol acrylamide.

7. A latex of claim 4 wherein the ethoxylated amine is (2), R is derived from coco fatty acid and $x$ and $y$ total 10 to 30 mols.

* * * * *